June 4, 1963  H. F. SCHAEFER, JR., ET AL  3,091,979
POWER TRANSMISSION
Filed May 8, 1961  5 Sheets-Sheet 1

Inventors
Hans Frederick Schaefer, Jr.
Frederic B. Jennings
By their Attorney
Carl E. Johnson

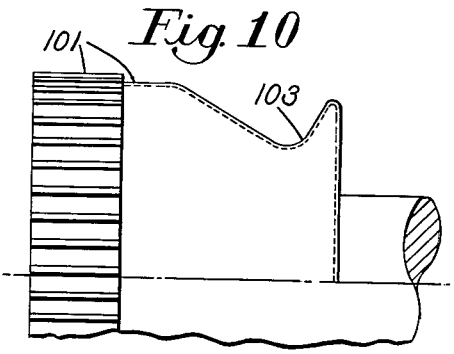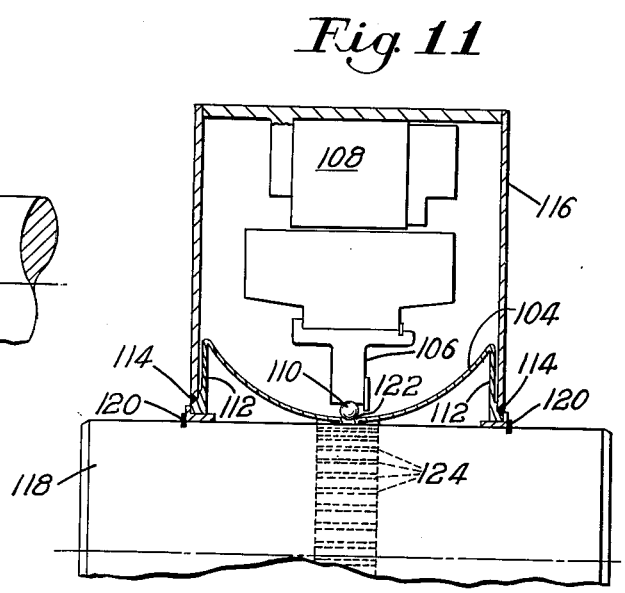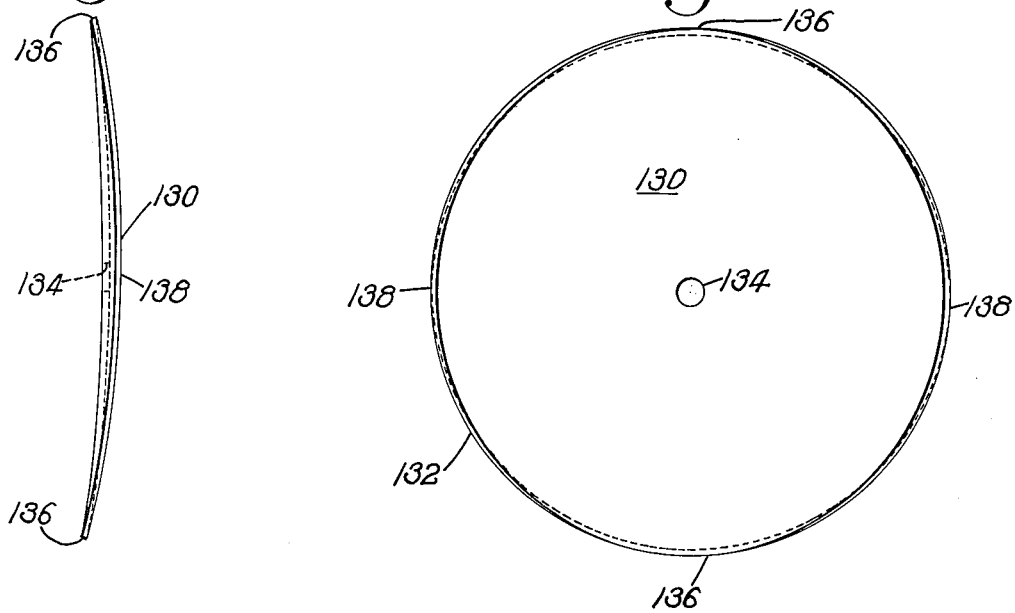

United States Patent Office 3,091,979
Patented June 4, 1963

3,091,979
POWER TRANSMISSION
Hans F. Schaefer, Jr., Rockport, and Frederic B. Jennings, Ipswich, Mass., assignors to United Shoe Machinery Corporation, Boston, Mass., a corporation of New Jersey
Filed May 8, 1961, Ser. No. 108,600
15 Claims. (Cl. 74—640)

This invention relates to power transmission and is herein disclosed as embodied in a transmission device of the type illustrated in United States Letters Patent No. 2,906,143 granted September 29, 1959, upon an application filed in the name of C. Walton Musser, for Strain Wave Gearing.

Numerous mechanisms of the type referred to, commonly called Harmonic Drives, have been manufactured. These usually comprise three coaxial elements: a reaction member, for instance a ring gear, a flexible gear, and a wave generator usually in the form of an elliptoidal cam.

The flexible gear, sometimes termed a flexspline and with which this invention is especially concerned, commonly comprises a hollow cylindrical mounting having a toothed end portion arranged to be deflected into an elliptoidal shape by means of the wave generator thus to cause the teeth of the flexible gear to engage the teeth of the ring gear near opposite ends of the major axis of the deflected flexible gear, the co-operating gear teeth being out of mating engagement near the minor axis. The other end of the cylindrical mounting is anchored either to a supporting frame or to a driven member. Upon rotation of one of the elements as an input member the mating positions of the co-operating teeth are progressively shifted angularly in effecting rotation of one of the other two elements as an output member.

In practice it has been found that if the cylindrical mounting is short in length, when the flexible gear is deflected from its original cylindrical shape, points along the periphery of the mounting change their angular positions relatively to each other. Consequently, it has sometimes been found to be desirable to anchor the cylindrical mounting to a driven member or to the supporting frame in a manner, such as by teeth or lugs, which permits relative sliding between the two parts. Also, because of the deformation, only a few of the teeth or lugs thus used can be in contact with the result that such design may seriously reduce the load-carrying capacity of the mechanism. In view of this, use has hitherto been made of a flexible gear in the form of a comparatively long tubular mounting one end of which is maintained substantially circular in shape. This construction eases the anchoring or attaching problem but introduces inter-related conditions known as "scalloping" and "coning." "Scalloping" is a term applied to the tendency of material in a plane perpendicular to the axis of a hollow circular cylinder, especially noticeable near an end thereof but occurring all along the cylinder, to be distorted away from the plane when the other end of the cylinder is deflected into a noncircular shape. "Coning" is the tendency of oppositely disposed longitudinal elements of the cylinder to become nonparallel when the originally circular cylinder is deflected as above mentioned. If one of these conditions exists then the other exists also. "Scalloping" on the one hand renders highly desirable and even necessitates a special design of the connection between the mounting and the anchoring member. "Coning," on the other hand, limits the effective lengths of the tooth faces and makes it difficult evenly to distribute the load on the teeth or on the bearings employed. Thus, when "coning" occurs, the co-operating teeth do not mesh along their entire lengths but tend to engage near their corners which may result in excessive wear or in an undesirable ratcheting effect particularly under heavy loads.

In view of the foregoing, it is an object of this invention to provide an improved power transmission, of the type referred to, which is of high load-carrying capacity for its size and is at the same time subject to a minimum of wear of the parts.

A further object of the invention is to provide such a power transmission in which the undesirable effects of "scalloping" and "coning" are substantially reduced or entirely eliminated and the means for anchoring the flexible gear are much improved.

Another object of this invention is to provide a hollow flexible gear having a prestressed portion axially spaced from the teeth of the gear and disposed transversely of the axis of rotation for inducing radial self-deflection in the toothed portion.

To these ends and as illustrated herein we have provided a novel power transmission having a ring gear, a flexible gear, and an elliptoidal member for progressively forcing the teeth of the flexible gear into engagement with the teeth of the ring gear in order to effect movement of a driven member, and in which transmission the flexible gear comprises a cylindrical mounting having a toothed portion substantially parallel to the axis of the ring gear, a portion which flares outwardly from the axis, together with a flanged end portion which is anchored either to the driven member or to a supporting frame. It has been found that in the operation of mechanisms properly constructed in accordance with the above, upon rotation of the elliptoidal member (or other harmonic wave generator means providing other than two lobes) the portions of the flexible gear extending parallel to the axis during progressive deformation of the gear remain substantially parallel to the axis. As a result the teeth of the flexible gear are enabled more fully to engage the teeth of the ring gear thus making it possible to extend the effective lengths of the teeth of the two members and to provide adequate bearing surfaces to enable the members to transmit high torque. Again, as a result of correct flaring configuration in the flexible gear mounting, the anchored end portion of that member tends to move in directions substantially parallel to the axis without greatly or harmfully disturbing (due to "scalloping") the connection between the flexible gear and the driven member or frame. This eliminates the necessity for any sliding connections between the gear and the driven member or between the gear and anchoring frame, and theoretically makes it possible to approach the torsional strength of the gear as a design limit. Experiment and mathematics have independently and quite reliably shown, more particularly, that a flexible gear correctly designed to eliminate coning and scalloping, regardless of the number of lobes of deflection imposed in one annular portion, requires for optimum mounting another annular portion defining a shell having negative curvature. In this connection "negative curvature" is herein used to characterize a surface that has one center of curvature located at one side thereof and another center of curvature located at its other side. The term "surface" is herein used broadly to refer to all exteriors or outside boundaries whether they be continuous and even in character, or discontinuous and interrupted, for instance as may be defined by spaced, interconnected wire-like elements.

These and other objects and features of the invention are disclosed in the following detailed specification and in the accompanying drawings, and are pointed out in the claims.

In the drawings, FIG. 1 is a view largely in longitudinal cross section of power transmission mechanism illustrating one embodiment of our invention;

Figure 1:
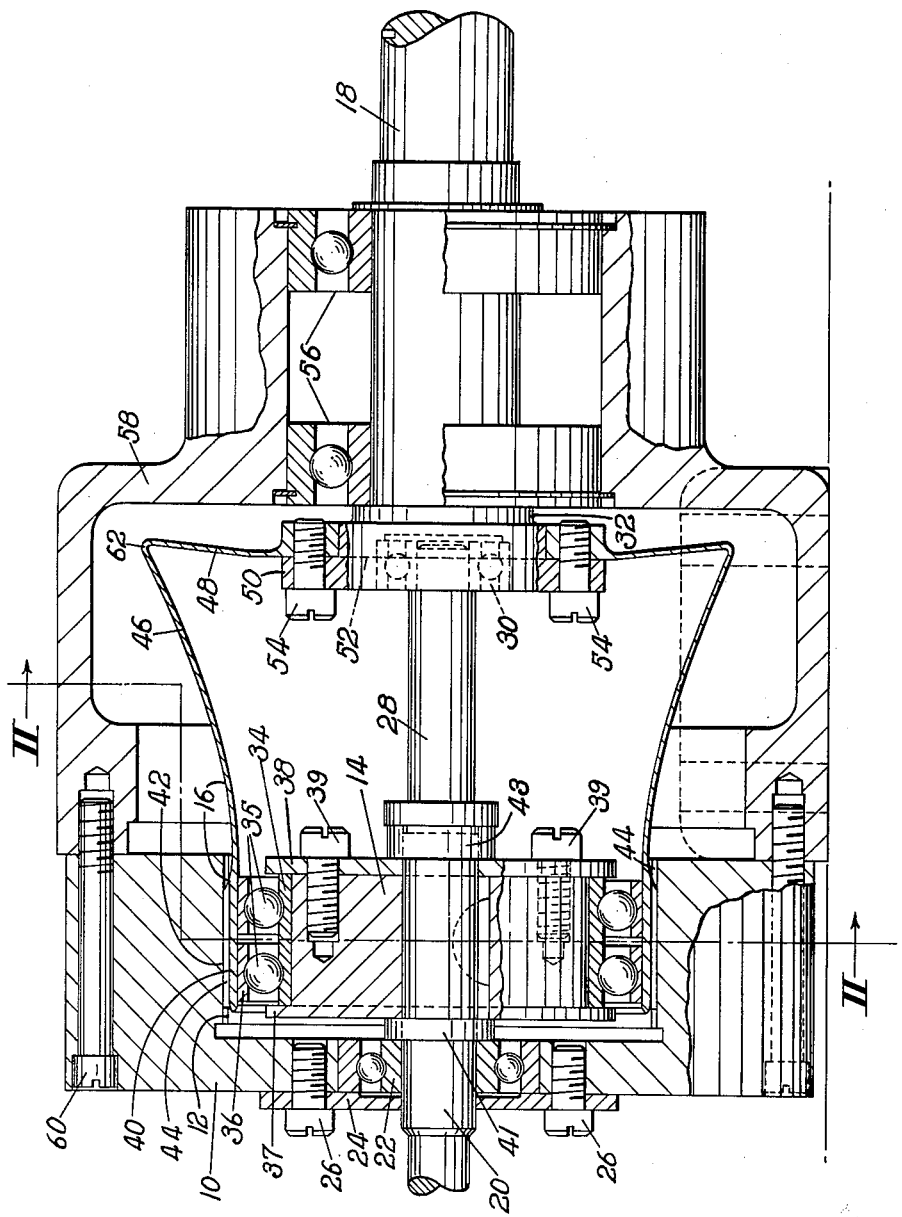

FIGS. 7-10, inclusive, are diagrammatic views representing shapes of flexible gears with their unique shell mountings constructed in accordance with the invention;

FIG. 11 is a diagrammatic view illustrating the invention as embodied in a further modified form, known as a double bell flexspline, having particular application in hermetically sealed transmissions;

FIG. 12 is a view in elevation, with some details magnified slightly, of a prestressed face plate which may form a mounting end for a flexible gear; and FIGS. 13 and 14 are edgewise views of the plate shown in FIG. 12 and taken at right angles to each other.

As shown particularly in FIGS. 1 and 2, one embodiment of the transmission comprises a casing 10 having integral therewith an internal circular ring gear 12, and an elliptoidal wave generator 14 for deforming a flexible gear 16 of novel configuration later described into engagement with the ring gear thereby to rotate at a reduced speed an output shaft 18 connected to the outer end of the flexible gear. Although the invention is herein illustrated as applied to mechanism for converting rotational motion to rotary movement of an output member, it will be appreciated that the invention is also applicable to transmissions wherein rotation of one member effects relative linear movement of another, for instance in accordance with the disclosure of United States Letters Patent No. 2,943,508, issued July 5, 1960, upon an application of C. Walton Musser.

The elliptoidal member 14 is preferably keyed to an input shaft 20 mounted in bearings 22 in an end of the casing and retained in position by a plate 24 and screws 26. The other or outer end 28 of the input shaft is positioned in a pilot bearing 30 in an enlarged portion 32 of the output shaft 18. The wave generator 14 closely bears against an inner bearing race 34 and through balls 35 applies pressure to outer races 36. The race 34 is held against axial movement by means of a flange 37 on the wave generator and a plate 38 secured thereto by screws 39. The flexible gear 16 comprises a cylindrical mounting 40 carrying external teeth 42 mating with teeth 44 of the internal ring gear 12. Preferably the teeth 42 and 44 are of the same form but there are a larger number of teeth 44 than teeth 42, with the result that rotation of the wave generator will result in rotation of the flexible gear at a reduced speed relatively to rotation of the wave generator and input shaft.

In order to connect the flexible gear 16 to an anchoring member, in this instance the output shaft 18, and in a manner insuring superior performance and fatigue life, the cylindrical mounting 40 has integral with it an outwardly flared portion 46 (FIG. 1) which terminates in an inturned or radial flange 48 adapted for connection to a circular clamping rim 50. The rim 50 is integral with a collar 52 of the enlarged portion 32 of the output shaft and is secured to the flange 48 by screws 54. The shaft 18 is supported in bearings 56 within an extension 58 of the casing 10, the extension being secured to the casing by bolts 60.

The construction of one illustrative transmission having been described, the invention will next be considered with regard to simpler aspects of the dynamics involved in arriving at a suitable mounting configuration for the flexible gear. Its design is based on the elimination of unwarranted axial motion due to scalloping. Various tubular mounting shapes were investigated, a typical flexible shell next to be explained being partly shown diagrammatically in FIG. 3. The deflection of the toothed end portion to elliptoidal shape must occur, according to the invention, without the axial or angular deflection incident to long cylindrical mounting if such benefits as longer bearings with lower loading, higher efficiency, larger torque capacity, and low blacklash are to be achieved. In the outset, then, desirably the toothed portion is carried by a thin, curved surface directly securable to an anchoring member such as an output shaft or casing of the mechanism. Wall thickness must be sufficient for the torque to be transmitted, of course, but should be small to keep bending stresses down and to hold the length of the mounting to a minimum.

Figure 3:
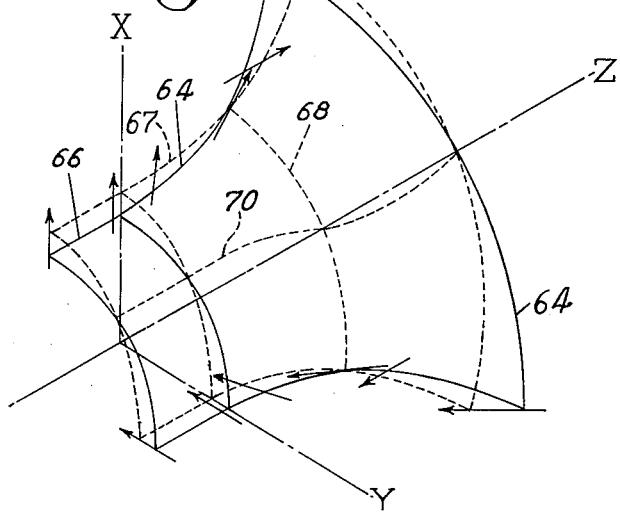
FIG. 3 is a diagrammatic perspective view illustrating a deformation and resultant displacement of one quadrant of a cylindrical shell having a flared or bell shape.

FIG. 3 illustrates in part a mounting surface curved along and around an axis of symmetry Z to keep stresses small, all except those due to torque and bending being eliminated. The full lines 64 indicate the shape of the first quadrant of a surface of revolution, the complete mounting form comprising a straight portion 66 (corresponding to that upon which teeth are normally formed) disposed parallel to that axis and extending to a vertical axis X, and a circularly flared portion extending beyond the axis X. It is a characteristic of thin cylindrical shells that a deflection which increases curvature along one element of a shell will result in a decrease in curvature along an element at right angles to the first element. In illustration of this phenomenon, forcing the cylindrical portion 66 to assume elliptoidal configuration (corresponding to operation in a harmonic drive unit) with the major axis lying in a vertical plane, i.e., parallel to the X axis shown in FIG. 3, the stressed shape will assume the form indicated by dashed lines 67 in FIG. 3. Now, the material of the shell being assumed inextensible, near the major axis in the X—Y plane, the surface curvature has been increased whereas at right angles (in the Y—Z plane) the curvature has been decreased. This is to say that the original shape shown by full lines has been flattened as shown by the dashed lines. Near the minor axis, however, surface curvature in the X—Y plane has been decreased, whereas at right angles (in the Y—Z plane) the curvature has been increased, i.e. the stressed shape is more sharply curved.

Points on the original shape shown in FIG. 3 undergoing deformation have thus been displaced, depending on their respective locations in one or more of the following ways: radially outwardly or inwardly of the symmetry axis, tangentially i.e. angularly about the symmetry axis in a plane normal thereto, or axially about an axis perpendicular to the symmetry axis. The direction of the displacements, at selected points in the vertical X—Z and horizontal Y—Z planes, is indicated by arrows. Thus at the major axis (X—Z plane) the displacement is entirely radial outwardly at an angle 90° to the symmetry axis, and in the minor axis (Y—Z plane) the displacement is entirely radial inwardly at an angle of 90° to the symmetry axis. Moving axially outwardly from the originally circular or straight portion 66 it is to be noted that the original unstressed shape intersects the deflected shape at nodes 68 and 70 in the flexural wave where, as verified by experiment, there is no deflection perpendicular to the shape itself and consequently the direction of displacement, if any, is along the shell surface. (In the unstressed shape the line 70 would be shown as a straight line and lie in a plane bisecting the angle between the X—Z and Y—Z planes, thus appearing in FIG. 3 to coincide with the Z axis.) Just beyond the nodes displacement becomes horizontal and along the symmetry axis as shown, and when determined further outwardly the direction of displacement becomes partly inward as shown. Relating this phenomena to the preferred mounting shape shown in FIG. 1, the axial length of the flared portion 46 relative to other dimensions of the flexible gear can be and is taken so that, as the wave generator is rotated, a point at the corner 62 (FIG. 1) of the gear formed between the flared portion and the flange 48 is moved in translation a short distance back and forth substantially parallel to the symmetry axis.

Figure 4:
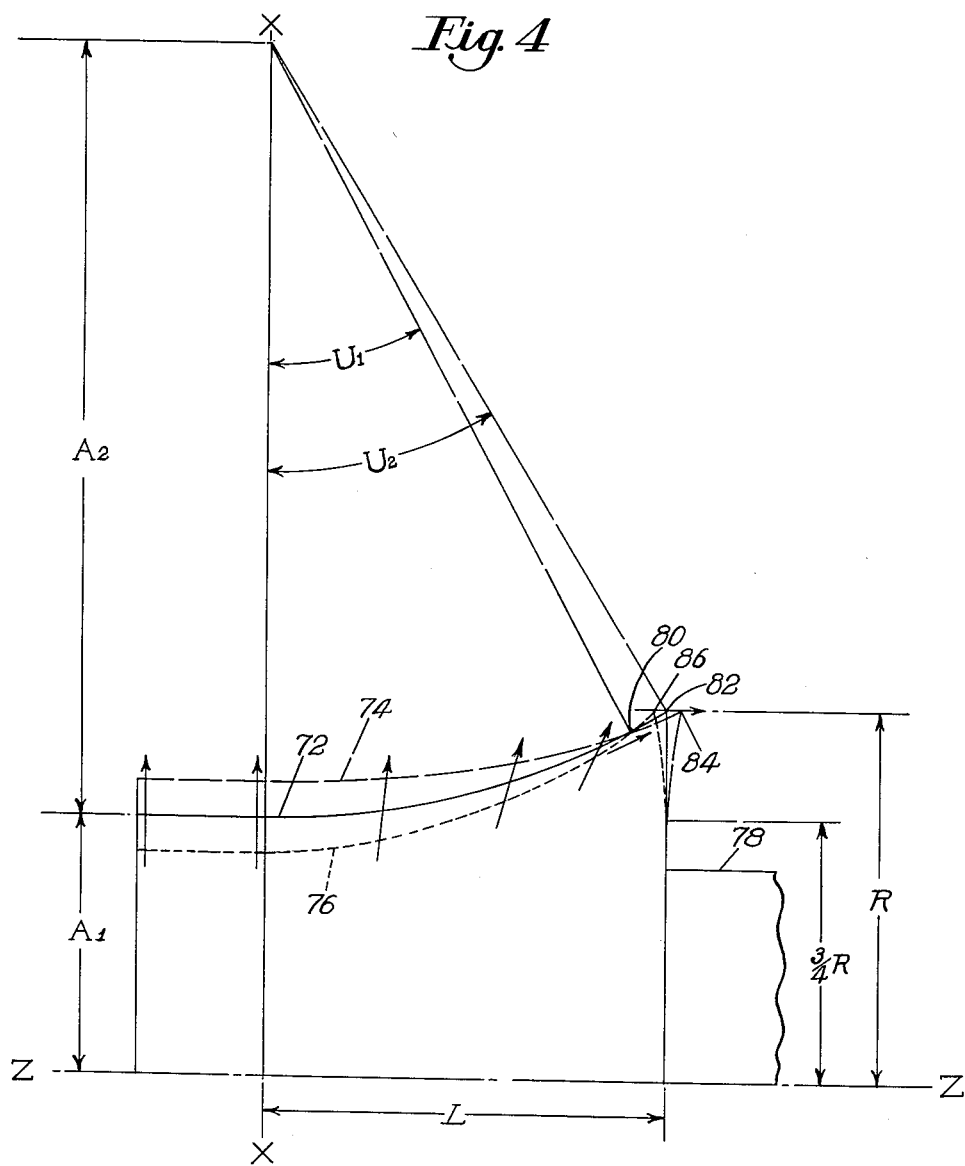
FIG. 4 is a diagrammatic view illustrating, in a side elevation, the relative dimensions of a flexible gear provided in accordance with this invention.

Reference is next made more particularly to FIG. 4 for consideration of other, mainly dimensional, aspects of a preferred metal mounting shape. The full lines 72 indicate an unstressed flexible gear having a cylindrical end portion and a flared portion terminating in a vertical flange secured to an anchoring member, for instance, a shaft 78. The radius of the unstressed cylindrical end is designated A1. The flared portion of the unstressed mounting lies along an arc of a circle which, in its vertical projection, has a radius designated A2 and a center on the X—X axis in the vertical plane coincident with the boundry between the stressed and the flared portions. The dashed lines 74, 76 show the extreme positions of the deformed shape in the vertical plane occasioned during rotation of the wave generator 14, longer dashes representing deformation due to the major axis being in the vertical plane and shorter dashes depicting deformation due to the minor axis being similarly located. During deformation between the extreme positions shown, surface points move directly as shown by the arrows of FIG. 4. Thus, the straight portion is displaced radially parallel to itself, and axially outward the peripheral parts of the flared portion are displaced with slopes less vertical, the slope at a nodal point 80 lying along a tangent to the shape. Slightly beyond this nodal point, radial deflection being at a minimum at points designated 82, 84 and 86, the flared shape may advantageously be cut off to provide a connection or radial flange without using the entire or further flared end portion of the shape shown in FIG. 3. Accordingly, a corner (having a radius R) between the selected flared portion and the radially extending flange is located at a locality 82 where displacement is substantially parallel to the axis Z—Z. During rotation of the corner it also moves through a flat arc, back and forth axially, but does not appreciably change in its angle included between the surfaces. The center of the flat arc about which the substantially undistorted corner is deflected is, from mathematical determination about three-fourths of the dimension R from the symmetry axis Z—Z. To provide room for the bending of this mounting the radius of the output shaft 78 probably should be about five-eighths of the dimension R.

Figure 5:
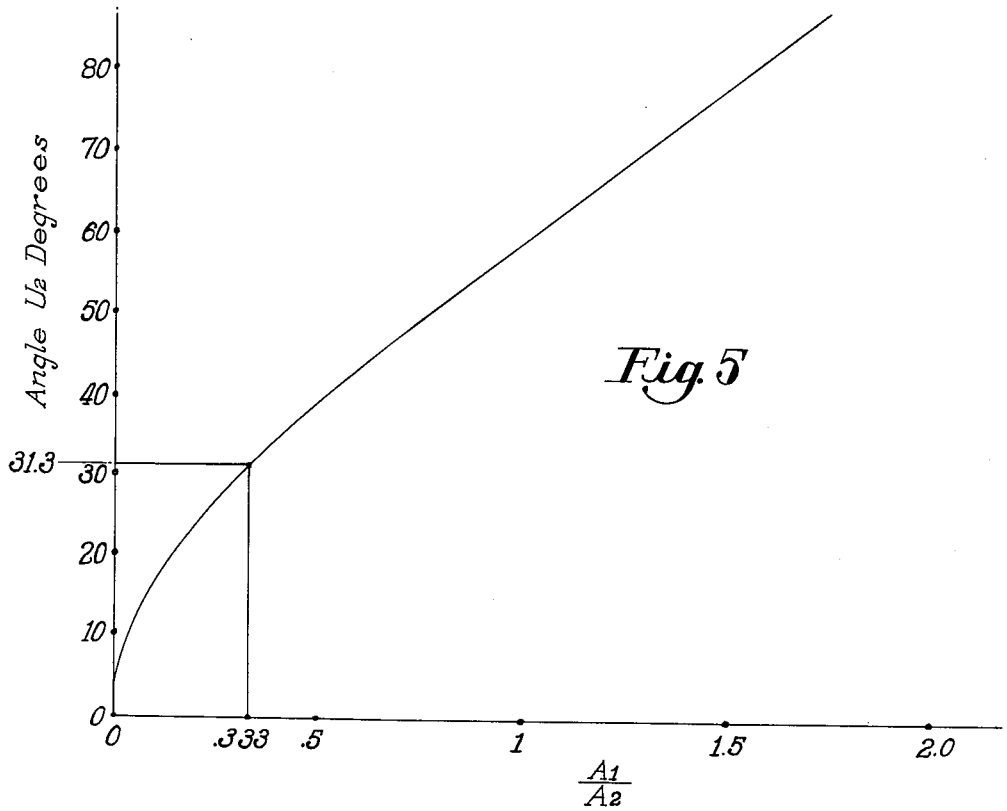
FIGS. 5 and 6 are graphs illustrating the relation between the dimensions of flexible gears of a shape corresponding to that shown in FIG. 4.
Figure 6:
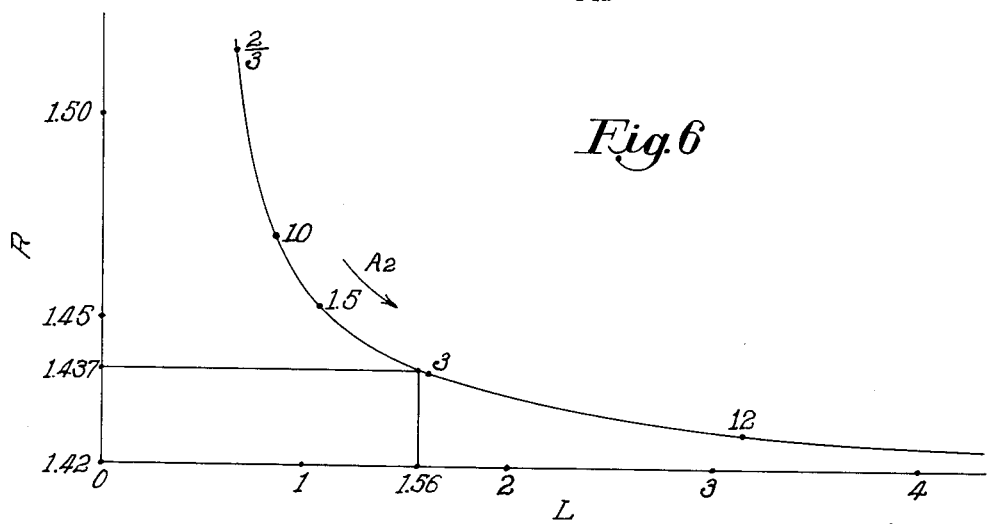
Figure 7:
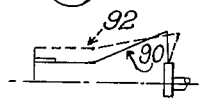
Figure 8:
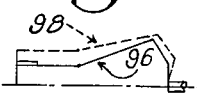

In the flexible gear shape shown in FIG. 4 the arc of the surface at the major axis extending from the vertical radius to the node 80 is measured by an angle U1, and the larger arc from the vertical to the undeflected corner 82 is measured by an angle U2. FIGS. 5 and 6 indicate dimensional relationships for only this general form of the gear. Referring to FIG. 5, assuming the radius R to remain constant, the angle U2 is plotted for various ratios of the radii A1 to A2. It may be noted, for instance, that in the case of the preferred flexible gear illustrated in FIG. 4 and for which the ratio is 1 to 3, the angle U2 is 31.3°, the node then being otherwise determined to occur at U1 equal to 28.1°. FIG. 6 graphically illustrates that as the axial length L of the flared portion in FIG. 4 becomes longer and the radius A2 is enlarged as indicated, the radius R of the critical corner 82 may be slightly diminished for this one form of the gear, as shown.

Figure 9:
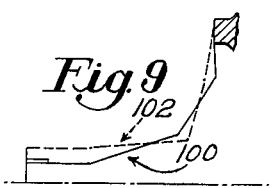

FIGS. 7 to 10, inclusive, illustrate at the major axis other selected forms of flexible gear mounting provided by the invention and wherein the flaring is not arcuate as in FIG. 4 but is conical in character, it being appreciated that junctions with the cylindrical, toothed portions, and between different conical portions, would normally be "rounded off." For lighter loads and situations where higher resistance to deformation is acceptable, a flared conical surface 90 (FIG. 7) may be employed, displacement of the critical corner then occurring as indicated by the dashed line 92. In the flexible gear shown in FIG. 8 a conical surface 96 is not permitted to extend outwardly beyond its nodal point. Instead, in order to hold the radial dimension down for the mounting shape, the "corner" is determined by providing a normal to the surface at the nodal point and adding a radial flange suitable to effect anchoring. Dashed line 98 indicates a limit of displacement for the shape 96. FIG. 9 illustrates a flared mounting shape 100 adapted to be anchored to a casing or the like, and useful, for instance, if space near the axis is not accessible. The dashed ine 102 indicates operating displacement to be anticipated for this mounting shape.

FIG. 10 diagrammatically shows a more complex form of a flexible gear 101 constructed according to this invention and having its annular portion of negative curvature in a region designated 103. For a particular transmission, especially if the strain wave imposed on the flexible gear is of other than a two-lobe shape, it may be difficult, in view of numerous practical considerations mathematically to determine an optimum location for the terminal "corner," but experimental methods have been found advantageous for this purpose. Experience with a variety of flexible gears for use in harmonic drives of numerous types has indicated, and mathematical analysis substantiates, that such gears are subjected to minimal coning and scalloping, if any, when an annular mounting portion thereof is of negative curvature.

In FIG. 11 a further form of our transmission is illustrated which may be said essentially to resemble that of FIG. 4 but is of "double bell" configuration. This flexible gear 104 is of special value in instances where a hermetically sealed drive is required. As shown, a wave generator 106, for instance of elliptoidal shape, is rotated by suitable means such as an electric motor 108 and may provide the outer race for bearing elements, suitable balls 110, arranged to run in a grooved race formed centrally on the periphery of the gear 104. Inturned radial flanges 112, 112 of this gear may respectively be secured at their ends as by brazing or welding 114 to a stationary casing 116. The latter is affixed axially on an output shaft 118 by means of snap rings 120, 120. The wave generator 106 may be of split ring construction (bronze has been used) and when assembled over the double bell flexspline or flexible gear 104 provides point loading of the latter deflecting it into elliptoidal shape as in the harmonic drive transmissions embodying either a cylindrical or single bell type of flexible gear. Internal teeth 122 on the tubular bell gear 104 engage with circular spline teeth 124 cut on the perimeter of the shaft 118 to drive the latter.

FIGS. 12–14 inclusive illustrate one form of a prestressed plate or disk 130 constituting an advantageous closure or mounting end for a flexible gear of the general type properly designed as above described. The plate 130 may be considered as taking the place of the radial mounting flange 48 (FIG. 1), for instance, a circular rim 132 of the plate being secured to the flared portion 46 at the corner 62, and a central portion 134 being adapted for connection to an input or output member. The plate 130, by reason of its prestressed condition, is slightly bowed or warped into a negatively curved surface producing a wave in the rim. Any two opposite rim points 136, 136 are accordingly on one side of the general plane of the disk. At right angles to a line connecting the points 136, 136, opposite rim points 138, 138 are disposed to a similar extent on the other side of the plane. As a consequence of uniform prestressing treatment the plate retains its negative curvature regardless of the angular position of the wave in the rim. The desired prestressed condition consists of a compressive stress tangentially in the rim balanced by a radial tensile stress. The intensity of these stresses diminishes inwardly from the rim and, in the case of the radial flange type mounting 48, the stresses varnish at or near the circle that is about five-eighths of the diameter of the plate and concentric therewith. The condition may simply be visualized as one in which the warped perimeter of the plate is slightly longer than the circumference attending a circular disk of the same diameter and lying wholly within a plane. The prestressing may be produced in a metal plate 130 by rolling the rim and applying stretching treatment in the rim in the tangential direction.

Figure 2:
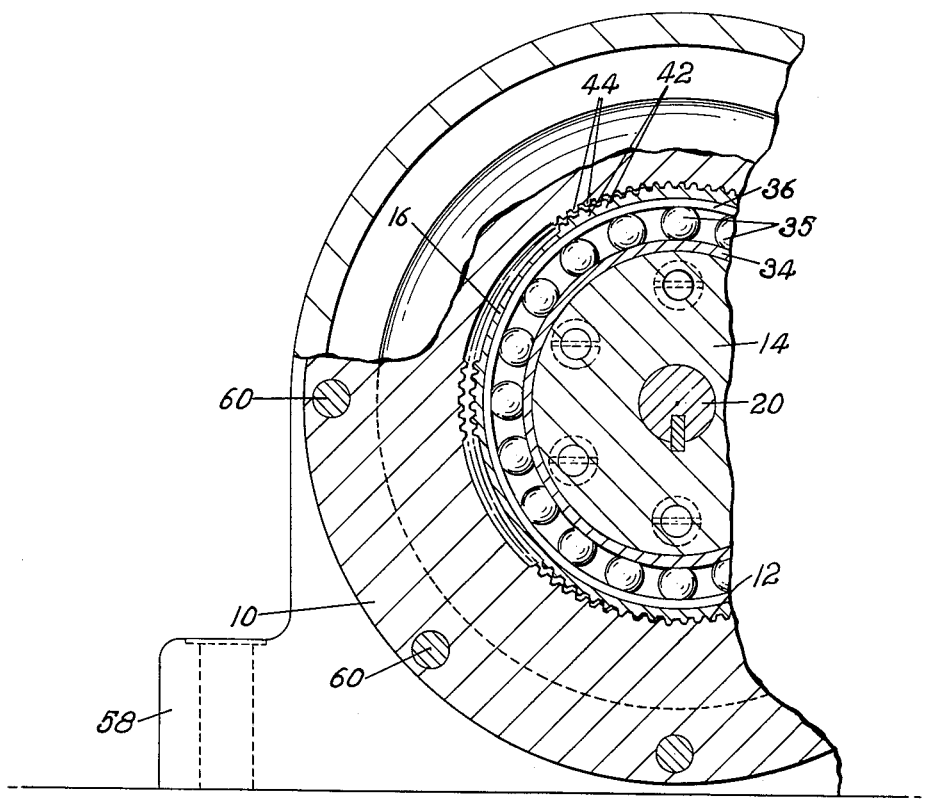
FIG. 2 is a cross sectional view of the mechanism shown in FIG. 1, taken along lines II—II.

When the flexible gear 16 (or one having either a conventional flexible cup-shape or configuration according to this invention) is provided with the prestressed mounting plate 130 of FIGS. 12-14 inclusive in lieu of the non-prestressed end plate 48 of FIG. 1, the circumferential junction or corner corresponding to that designated 62 in FIG. 1 is displaced from planar condition by forces acting axially. This is to say that some of the prestressing influence in the plate is transferred to the flexible gear at the perimeter of attachment in the form of axial forces and deflections, and these are transformed by means of the flexible gear configuration into radial and tangential forces and deflections producing an elliptoidal shape in the toothed portion 40 of the gear. (It will be understood that if the axial deflection at four equi-spaced peripheral points on the unmounted prestressed ring or plate 130 be considered to have been a maximum of ±1, i.e. two points at +1 and two at —1, the same points after attachment and imparting of stress to the flexible gear will still lie on a wavy perimeter but have a maximum axial displacement from a central transverse plane which is reduced to a smaller value lying between zero and ±1.) The prestressing of the plate 130 being uniform, eccentricity of the elliptoidal shape of the toothed portion will remain constant regardless of the angular orientation of the wave in the plate. Either the inner or the outer perimeter of the ring 130 may be secured to the flexible gear in this embodiment of the invention, the portion 134 normally being of larger diameter than illustrated when serving as the attaching rim. In either arrangement the significant fact is that axial deflection imparted to one peripheral portion of the flexible gear by such means as the prestressed plate 130 results in radial deflection of the axially spaced, toothed portion of the gear. (Such deflection in the case of the cup-type gear, however, is not precisely parallel to the gear axis as previously noted.) The initially circular splined portion 40 (FIG. 1) is thus elastically induced into elliptoidal shape and may freely receive a correspondingly shaped wave generator such as that shown at 14 in FIG. 1 together with its bearing.

Operating characteristics of the prestressed ring type of flexible gear will next be considered in relation to that of the non-prestressed flexible gear configuration. Both types may utilize a wave generator cam 14. The latter in each case may serve as an input member driven in rotation relatively to the flexible gear. There are normally two distinct functions served by a harmonic drive wave generator: it acts during rotation to cause the radial deflection wave to advance circumferentially in the toothed portion of the flexible gear, and it acts radially (usually through a bearing) to deflect the flexspline from circular to elliptoidal shape. These functions may be performed separately and by different means than a cam. For example, the advance of the wave may be effected electromagnetically, while the wave generator bearing may be relieved of the load required to deflect the flexible gear radially by using the prestressed mounting or warped end plate 130 as the source of necessary elastic properties. When the wave generator and its bearings are employed in the prestressed ring-type of flexible gear, their purpose is to advance the deflection wave. Bearing load due to deflection of the gear will now be zero at both its major and minor axes, such other bearing load being incurred only in the 45° localities intermediate these axes whereat drive is being effected. Consequently bearing load due to advancement of the wave load will be proportional to the load and to output torque, a very desirable characteristic in servo mechanisms. The flexible gear shaped with negative curvature according to this invention and further fitted with the prestressed mounting plate may therefore be considered radially self-deflecting, and will by reason of its configuration resist axial flattening of its mounting plate while transmitting the radial force required elastically to deflect the teeth of the flexible gear. Elimination of the hitherto conventional wave generator cam and bearing by means of this embodiment of the invention renders its use especially valuable for servo mechanisms wherein moment of inertia would be significantly reduced and no-load acceleration would be practically instantaneous.

Having thus described our invention what we claim as new and desire to secure by Letters Patent of the United states is:

1. For use in a harmonic drive type transmission including a reaction member, a tubular flexible gear extending along an axis of symmetry, said gear having a toothed peripheral portion deflectable relatively to the axis to provide a plurality of mating engagements with the member interspaced by nonmating positions, and including an axially flexible coaxial mounting comprised, at least in part of an annular surface defining a shell having negative curvature.

2. The transmission gear as set forth in claim 1 and characterized further in that an end of the flexible gear remote from the toothed portion is provided transversely of said axis with a prestressed circular plate secured at its rim to said mounting, the stressing of said plate causing it to be axially warped from planar condition, opposite points on the rim being equally spaced from one side of the general plane of the plate and other opposite rim points 90° from those first mentioned being spaced similarly on the other side of the plane, whereby the toothed portion is induced into elliptoidal shape.

3. A harmonic drive of the type having a ring gear provided with teeth, a flexible gear formed with teeth, a driven member, and wave generator means arranged for progressively forcing the teeth of the flexible gear into engagement with the teeth of the ring gear to effect rotation of the driven member upon input rotation to either of said gears or said wave generator means, characterized by the fact that the flexible gear is a tubular member having one portion substantially parallel to the axis of the ring gear, an intermediate portion which flares outwardly, and an axially flexible end portion which is connected to the driven member.

4. In a harmonic drive having a ring gear, a tubular flexible gear, a driven member, and an elliptoidal wave generator for progressively forcing the flexible gear into engagement with the ring gear to effect rotation of the driven member; the improvement which consists in forming the flexible gear with a portion extending substantially parallel to the axis of the ring gear and operatively engaging the ring gear, a portion which flares outwardly with negative curvature relatively to the axis, and an axially flexible flange mounting portion which extends inwardly from the flared portion and relatively to the axis and is connected to the driven member.

5. In a harmonic drive type transmission including a ring gear, a tubular flexible gear arranged in telescoping relation to the ring gear and extending along an axis of symmetry, said flexible gear having an elliptoidally deflectable toothed portion radially displaceable parallel to itself and normal to the symmetry axis for cooperation with the ring gear and an axially flexible mounting for the toothed portion integral therewith, said mounting having a configuration comprising a surface flared outwardly from the symmetry axis and extending through a corner displaceable substantially parallel to the axis in response to said deflection normal thereto.

6. A transmission as set forth in claim 5 further characterized in that the mounting extends in an outward flare to a nodal corner of substantially 90° whereat, in response to said deflection normal to the symmetry axis, deflection is in a direction substantially tangent to the flared surface, the mounting then terminating in an end plane perpendicular to the axis for anchoring.

7. In a power transmission of the harmonic drive type, a reaction member, a tubular flexible gear, a portion of which extends parallel to a symmetry axis and is radially deflectable to elliptoidal shape during operation for co-operation with said member, and a mounting for the gear including a portion which is formed with a coaxial, outwardly flared surface which, in the plane of the major axes of said shape, extends from the radially deflectable toothed portion of the gear in a circular arc at least to a nodal corner undergoing substantially no resultant deflection perpendicular to the shape, said surface defining a flexible shell for attenuating axially the radial deflection of the gear.

8. In a harmonic drive type transmission wherein a wave generator progressively radially deflects a flexible gear into engagement with a ring gear to effect rotation of a driven member; means mounting the flexible gear for rotation about an axis substantially common to the flexible gear and the ring gear, said mounting means extending along the axis and comprising a tubular extension flared outwardly from said axis, and an axially flexible planar end portion normal to the axis forming a driving connection between the extension and said driven member, the wall of said extension being of such thickness and axial flexibility that, as a consequence of the radial deflection, peripheral points thereon outwardly from said engagement are decreasingly displaced radially and increasingly axially, and said wall terminating substantially in the localities where the points undergo only axial displacement effecting corresponding flexure of said end portion.

9. A power transmission mechanism comprising a ring gear, a tubular flexible gear, and a driven member, all extending along a common axis, in which the flexible gear has inner portions which extend substantially parallel to the axis and are adapted to engage the ring gear, intermediate flexible portions of negative curvature which flare outwardly of the axis, and end portions which are at least in part axially flexible and extend inwardly toward the axis and are connected to the driven member, together with wave generator means operatively coupled to an input means for progressively forcing the inner portions of the flexible gear into engagement with the ring gear to effect rotation of the driven member.

10. A power transmission comprising an elliptoidal wave generator, a flexible gear having a cylindrical portion arranged to be deflected radially by the wave generator, a ring gear in toothed engagement with the flexible gear, the flexible gear having an outwardly flared, flexible portion extending from the cylindrical portion, and an axially flexible flanged end portion normally extending from points on the flared portion and along a plane perpendicular to the axis of the flexible gear, an input member for rotating the generator about said axis, the points being so spaced from the cylindrical portion that its radial deflection imparts substantially only progressive axial movement to the flanged portion, and means for anchoring the flanged portion whereby output may be taken from one of the flexible and ring gears.

11. For use in connecting a harmonic drive type transmission to an input or an output member; a tubular flexible member including a radially deflectable annular portion having an axis of rotation, an intermediate portion flared outwardly from the axis and comprising an annular surface defining a shell having negative curvature, and a radially disposed, axially flexible circular mounting plate secured at its rim to the intermediate portion remote from said radially deflectable annular portion, said plate being preformed with an axial wave on its rim shaped to correspond to radial deformation of the radially deflectable portion, a central portion of the plate being secured to said input or output member.

12. For use in a harmonic drive transmission, a tubular, flexible, torque member comprising, along an axis of rotation, a radially deflectable portion, and a flared mounting therefor having a circular end disposed transversely of the axis and of greater diameter than any diameter of the radially deflectable portion, said end being prestressed by a combination of forces acting tangentially in compression and radially in tension to provide a wavy rim capable of inducing, by means of axial forces applied progressively around the rim, corresponding radial rotary deflection in said portion.

13. A harmonic drive transmission comprising inner and outer cooperating gear members, a wave generator member in engagement with one of the gear members, an anchoring member arranged in driving relation to one of the gear members, one of the gear members having a toothed cylindrical portion, an outwardly flared, flexible portion including a surface defining a shell shaped with negative curvature, and an axially flexible flange portion connecting the flared portion to the anchoring member, and power means for rotating one of the members thereby to effect rotation of one of the other members.

14. A new article of manufacture which consists in a tubular transmission member having an axis of symmetry, said member having a radially deflectable annular portion formed with axial teeth substantially parallel to said axis, and a thin-walled, axially flexible supporting portion merging therewith and formed with an annular, axially extending shell-like surface characterized at least in part by negative curvature, said supporting portion being adapted by means of its configuration to maintain the teeth substantially parallel to the axis during imposition of spaced waves of rotary radial deflection in the toothed portion.

15. In a harmonic drive transmission including a flexspline having a toothed peripheral portion radially deflectable progressively to elliptoidal shape during operation, an axially warped disk-like member disposed transversely of the axis of rotation of the flexspline and coupled thereto in axially spaced relation from said toothed portion, the warping stresses of the member acting axially on said flexspline to induce radial deflection in the toothed portion.

References Cited in the file of this patent

UNITED STATES PATENTS

| | | |
|---|---|---|
| 1,999,267 | Willgoos | Apr. 3, 1935 |
| 2,932,986 | Musser | Apr. 19, 1960 |
| 2,995,909 | Russey | Aug. 15, 1961 |

OTHER REFERENCES

Machine Design, April 13, 1961, pages 151–156.